United States Patent
Boeckle

(10) Patent No.: US 8,358,088 B2
(45) Date of Patent: Jan. 22, 2013

(54) INTERFACE CIRCUIT FOR TRANSMISSION OF DIGITAL SIGNALS

(75) Inventor: Reinhard Boeckle, Maeder (AT)

(73) Assignee: Tridonic Atco GmbH & Co. KG, Dornbirn (AT)

( * ) Notice: Subject to any disclaimer, the term of this patent is extended or adjusted under 35 U.S.C. 154(b) by 1345 days.

(21) Appl. No.: 11/632,935

(22) PCT Filed: Jun. 22, 2005

(86) PCT No.: PCT/EP2005/006752
§ 371 (c)(1),
(2), (4) Date: Mar. 18, 2008

(87) PCT Pub. No.: WO2006/010417
PCT Pub. Date: Feb. 2, 2006

(65) Prior Publication Data
US 2009/0003417 A1   Jan. 1, 2009

(30) Foreign Application Priority Data

Jul. 23, 2004  (DE) .......................... 10 2004 035 753
Aug. 24, 2004  (DE) .......................... 10 2004 040 947

(51) Int. Cl.
*H05B 37/02* (2006.01)
(52) U.S. Cl. ......... 315/312; 315/297; 315/254; 315/206
(58) Field of Classification Search ............. 315/200 R, 315/201–208, 291, 294, 297
See application file for complete search history.

(56) References Cited

U.S. PATENT DOCUMENTS

| | | | |
|---|---|---|---|
| 2,625,260 A | 1/1953 | Muros | |
| 5,343,122 A * | 8/1994 | Sugimori et al. | 315/209 R |
| 5,581,158 A * | 12/1996 | Quazi | 315/149 |
| 5,581,161 A * | 12/1996 | Gong | 315/307 |
| 5,588,021 A | 12/1996 | Hunt et al. | |
| 5,952,849 A | 9/1999 | Haigh et al. | |
| 6,107,754 A * | 8/2000 | Kim | 315/291 |
| 6,118,228 A * | 9/2000 | Pal | 315/307 |
| 2004/0140777 A1 | 7/2004 | Fosler | |
| 2008/0278092 A1* | 11/2008 | Lys et al. | 315/247 |
| 2010/0244726 A1* | 9/2010 | Melanson | 315/291 |
| 2010/0308738 A1* | 12/2010 | Shteynberg et al. | 315/185 R |

FOREIGN PATENT DOCUMENTS

| | | |
|---|---|---|
| EP | 0 198 263 A | 10/1986 |
| EP | 0 490 329 A | 6/1992 |
| WO | WO 91/14327 A | 9/1991 |

OTHER PUBLICATIONS

International Search Report for PCT/EP2005/006752 mailed Dec. 9, 2005 (English).
International Preliminary Report on Patentability for PCT/EP2005/006752 mailed Feb. 1, 2007 (English).

* cited by examiner

*Primary Examiner* — Don Le
(74) *Attorney, Agent, or Firm* — Marshall, Gerstein & Borun LLP

(57) ABSTRACT

The transmission branch of an interface circuit has a transformer. On the input side there are applied to the transformer, for example from a controller, high-frequency impulses. The output side of the transformer controls a switch, such as for example a power transistor, which modulates the desired digital signals onto a connected bus line.

24 Claims, 3 Drawing Sheets

INTERFACE CIRCUIT FOR TRANSMISSION OF DIGITAL SIGNALS

BACKGROUND OF THE INVENTION

1. Field of the Invention

The invention relates to interfaces, which can be used for example in connection with operating devices for the operation of illumination means.

2. Related Technology

Illumination systems for the illumination of large complexes or buildings, in which a plurality of luminaires arranged decentrally distributed are controlled by a central control unit, require the possibility of an extensive and reliable data interchange due to the variety of functions available. Whilst with earlier illumination systems it was known solely to transmit to the various luminaires switch-on and switch-off commands from a central control unit, modern illumination systems now provide the possibility of a data transfer from the luminaires to the central control unit, to transmit for example information with regard to the current operating state as well as fault information. The luminaires or lamp operating devices provided for the operation of such an illumination system correspondingly have a communication interface which is configured not only for data reception but also is able itself to send information on a bus line system.

The recently newly developed illumination systems or lamp operating devices work predominantly according to the so-called DALI standard. This DALI (Digital Addressable Lighting Interface) standard is a new simple and user-friendly interface for the realization of intelligent and functional light management systems. An substantial feature of the DALI standard is that the control commands and information are transmitted in a digital manner and correspondingly the various devices of the system have a bidirectional digital interface.

It is required in the transmission of digital control signals for light control that the bit lengths and flank developments (steepnesses) realised by the interfaces are kept within a certain range. For example according to the DALI standard there is permitted a tolerance range of only ±10% compared with the ideal bit length of 416 μsec. Since however the interfaces being used are normally constructed as economically as possible, and particularly the transmission branch responsible for the realization of the bit lengths is configured considerably more complexly and therefore more susceptible to component tolerances than the reception time is, there arises the problem that this requirement can be adhered to only with difficulty. Particularly temperature effects and intolerances of the components can lead in the worst case to the bit length realized by the transmission branch of an interface lying outside the permitted range, which would prevent a data interchange.

Similar problems also arise with non-digital bidirectional interfaces with which the signals distributed by the transmission branch also must likewise fulfil certain requirements, which—due to the trend towards cost saving mentioned above—can be complied with only with difficulty.

SUMMARY OF THE INVENTION

The invention provides an interface circuit whose transmission branch has improved characteristics of the flanks of digital signals.

In accordance with a first aspect, the invention provides an interface circuit having at least one transmission branch for the transmission of digital signals from an operating device for illumination elements to a connected bus. The transmission in the transmission branch is carried out with the aid of a transformer.

On the input side a signal is preferably applied to the transformer that in comparison with the bit length of the digital signals is of high frequency.

The bit length of the digital signals on the bus preferably corresponds to the period during which the transformer is controlled on the input side with a high frequency signal.

The secondary side of the transformer preferably controls a switch which modulates the digital signals onto the bus.

The switch is preferably a transistor.

The flank steepness of the switching processes of this switch is preferably selectable.

The flank steepness of the switching processes of this switch is preferably selectable by corresponding choice of the parameters of filter circuits connected upstream of the switch.

The filter circuits are preferably low pass circuits, for example.

The rising and falling flanks are preferably adjustable independently of each other.

The transformer on the input side is preferably controlled by a controller which for example is part of an operating device for illumination means.

The circuit is preferably configured as a bidirectional interface and correspondingly additionally may have a reception branch.

In accordance with another aspect, the invention provides an operating device for illumination elements has a circuit in accordance with the above-mentioned kind.

The invention also provides a method for the transmission of signals from a control device to a connected digital bus. The primary side of a transformer is thereby controlled by a control device. The secondary side of the transformer controls a switch which modulates digital signals onto the bus. Thus, the switching processes of the switch represent the flanks of the bit signals.

BRIEF DESCRIPTION OF THE DRAWINGS

Below, the invention is explained in more detail with reference to the accompanying drawings. There is shown.

DETAILED DESCRIPTION

Figure 1:
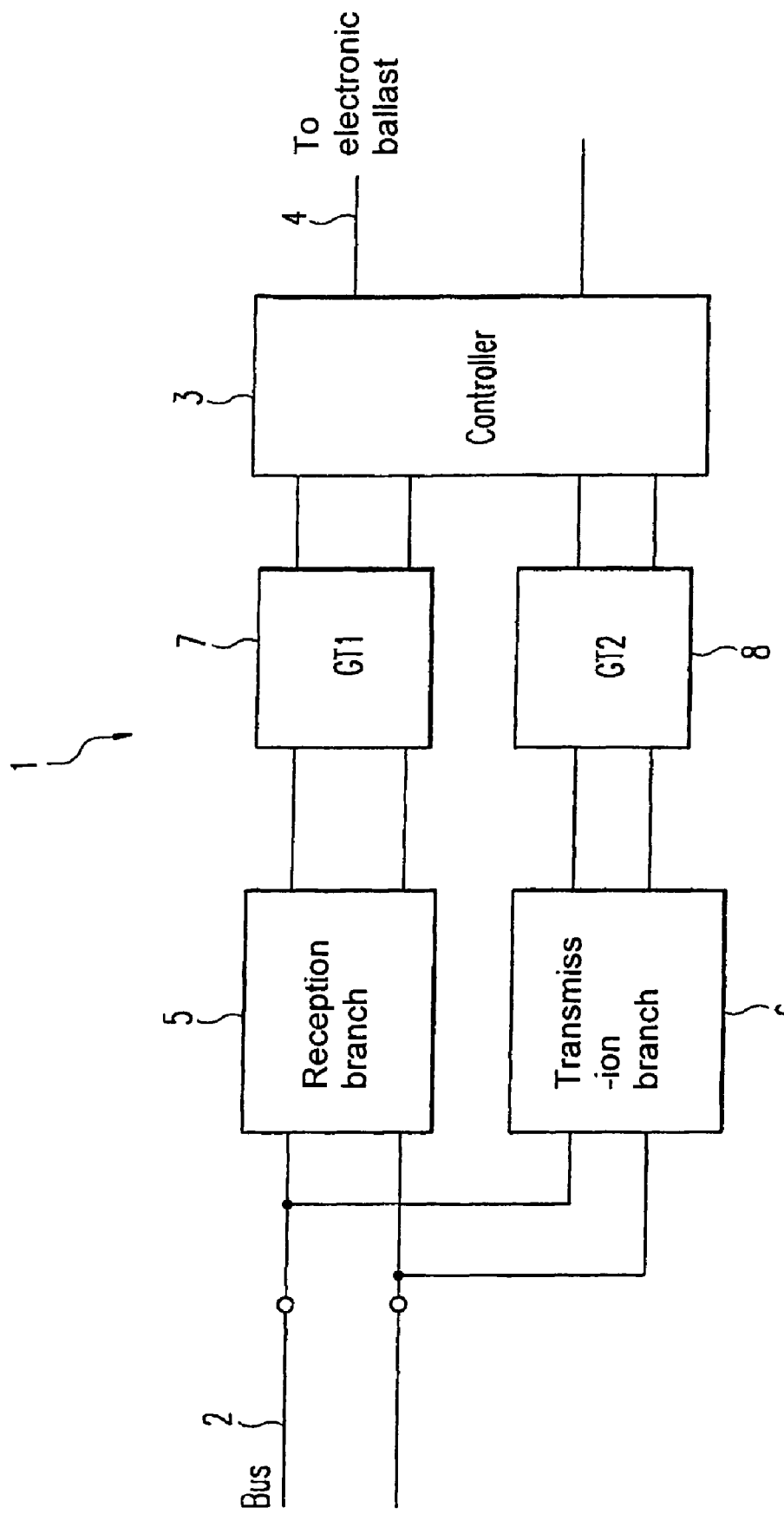
FIG. 1 schematically, the construction of a bidirectional interface in accordance with the invention.

Firstly FIG. 1 shows generally the construction of a bidirectional interface 1 which is configured for the reception and for the transmission of data via the two lines of a bus line system 2. The construction of this interface 1 corresponds substantially to the classic construction of bidirectional interfaces since the measures mentioned above according to the invention are primarily of software-related nature are and do not require use of additional hardware components.

A component of the interface 1 is correspondingly a controller 3 which is responsible for the data reception and the data transmission and is in connection with a device to be controlled via output lines 4. In the case of the present exemplary embodiment it is to be assumed that the device to be controlled is a device for operating an illumination element, in particular for a lamp as for example with a gas discharge lamp, LEDs or halogen illumination element. An electronic ballast (EVG) is preferred for gas discharge lamps.

On the one hand, further components of the bidirectional interface are a reception branch 5 which is responsible for receiving information on the bus lines 2 and is connected to the controller 3 via a first element 7 for electrical decoupling. For the transmission of information from the controller 3 to the bus lines 2 there is furthermore provided a transmission branch 6 which is connected to the controller 3 via another element 8 for electrical decoupling.

Figure 2:
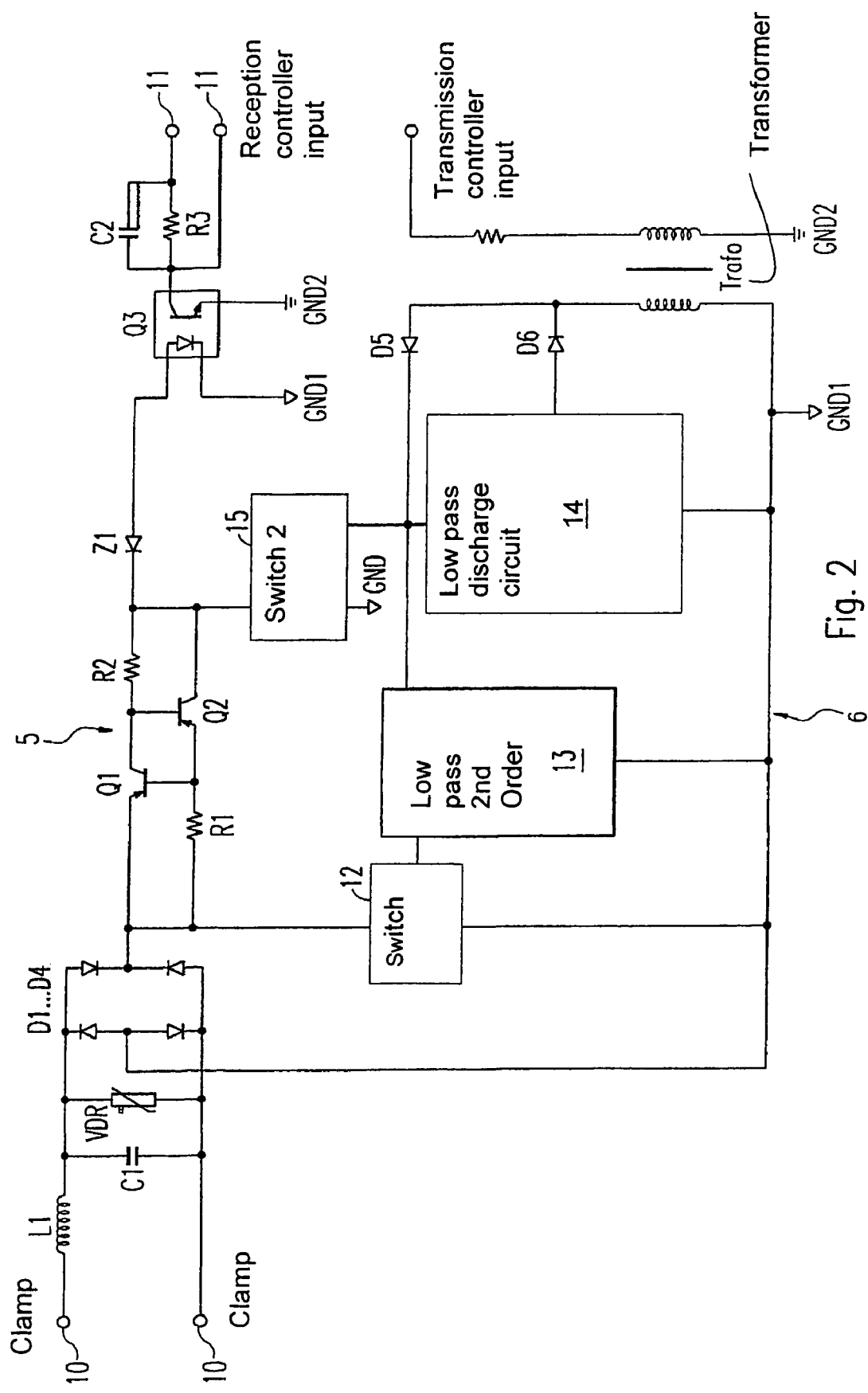
FIG. 2 a possible configuration of the bidirectional interface according to the invention.

A possible configuration of the transmission and reception branch as well as the elements for electrical decoupling is represented in FIG. 2. An unusual feature of the circuit represented in FIG. 2 resides in that the control of the transmission branch is effected via a transformer—not, as usual in the case of to-date known bidirectional interfaces, via an optical coupling device. As is explained in more detail below, this configuration brings about special advantages with regard to the possibilities for data transmission. It has to be said that the present invention is however under no circumstances restricted to the configuration of a bidirectional interface specifically represented in FIG. 2.

The interface represented in FIG. 2 is a digital bidirectional interface which is connected to the two bus lines of the bus line system via two clamps 10 and on the input side has firstly a damping network consisting of an inductance L1, a capacitor C1 as well as a voltage dependent resistance VDR. The function of this network consists in damping transients which occur on the bus lines; that is, very short, fast and strong voltage and current changes. This is required since the interface is to be connectable also to the normal mains voltage line and should have an electric strength of up to 1000 volts.

A rectifier including four diodes D1 to D4 follows the damping network, the function of which rectifier is in principle to pass on the signals applied at the two terminal clamps 10 in the same way so that a connection of the two clamps 10 to the lines of the bus line system can be carried out in any desired manner.

The reception branch 5 of the interface has in the following a circuit arrangement of two transistors Q1 and Q2 as well as two resistances R1 and R2, the task of which is restricting the current strength of the received signal passed on to the optical coupling device Q3 to a value of at most 2 mA. This corresponds to the specifications according to the DALI standard. Via a diode Z1 the signals are then passed on correspondingly to the optical coupling device Q3, which serves as element for electrical decoupling and finally passes on the signals via a parallel circuit consisting of a capacitor C2 and a resistance R3 to two output terminals 11 which connect the reception branch of the interface to the controller.

For the transmission of signals on the bus lines, till now, with classic interfaces, an optical coupling device was also provided, which due to an extreme temperature drift of the so-called Current Transfer Ratio (CTR) is only poorly suitable for adhering to the required tolerance limits for the predetermined bit times. Another problem of an optical coupling device resides in the fact that this has a too low overvoltage strength.

In the case of the circuit arrangement represented in FIG. 2 there is correspondingly now used as element for electrical decoupling a transformer which controls a switch 12 for the production of the digital signals at the terminal clamps 10. The advantage of the employed transformer consists in that this can transfer the energy for control of the switch 12 and the energy does not have to be taken from the interface.

Due to the special configuration the rise time and fall time of the flanks of the bus signal can be set virtually independently of each other. This has the consequence that the quality of the signal thereby achieved is improved decisively, which relates both to the tolerance of the bit times and the uniformity of the flanks.

The production of digital signals at the terminal clamps 10 is then carried out as follows:

For the production of a bit signal the transformer is controlled with a high-frequency, and to be more precise with a frequency which corresponds approximately to 100 times the desired bit time. In other words there is effected at the primary winding of the transformer, during the transmission time of an individual bit, a voltage change approximately 100 times, which is passed on to the secondary winding.

The high-frequency alternating voltage applied at the secondary winding of the transformer has the consequence that a low pass of 2nd order 13 upstream of the switch 12 is charged, which in turn results in that the switch 12, which may be a field effect transistor, is switched conducting and correspondingly a bit signal is generated.

The low pass of 2nd order 13 is connected to a low pass discharge circuit 14 which permanently tries to discharge the low pass of 2nd order 13 again. As long as the transformer is high-frequency controlled, though, this is prevented by the two diodes D5 and D6. Only at the time at which a high-frequency signal is no longer applied on the primary side of the transformer, can the low pass discharge circuit 14 discharge the low pass of 2nd order 13 until by reason of this the switch 12 again opens and correspondingly a rising signal flank is generated for the ending of the bit signal.

Figure 3A:
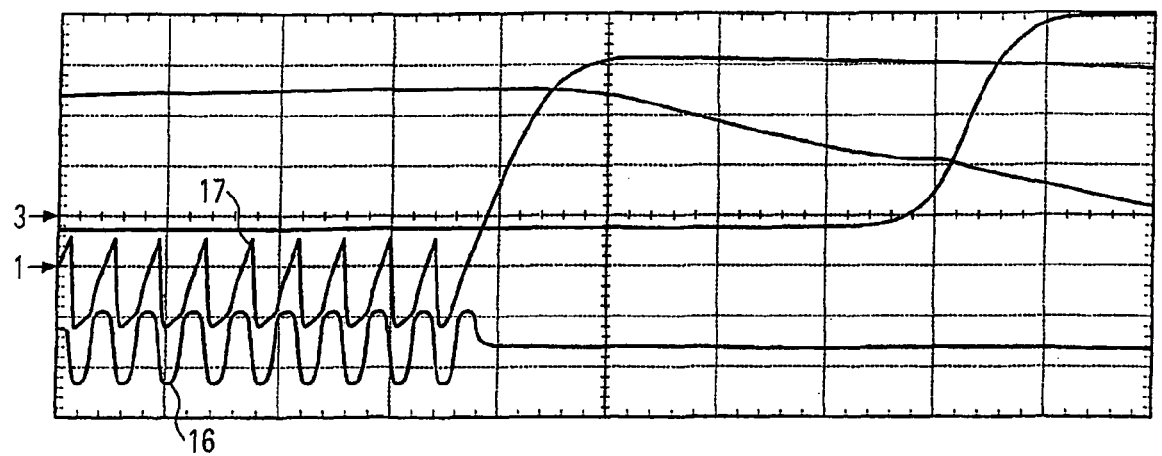
FIGS. 3a and 3b a transmission process where the present invention is applied to the DALI industry standard.
Figure 3B:
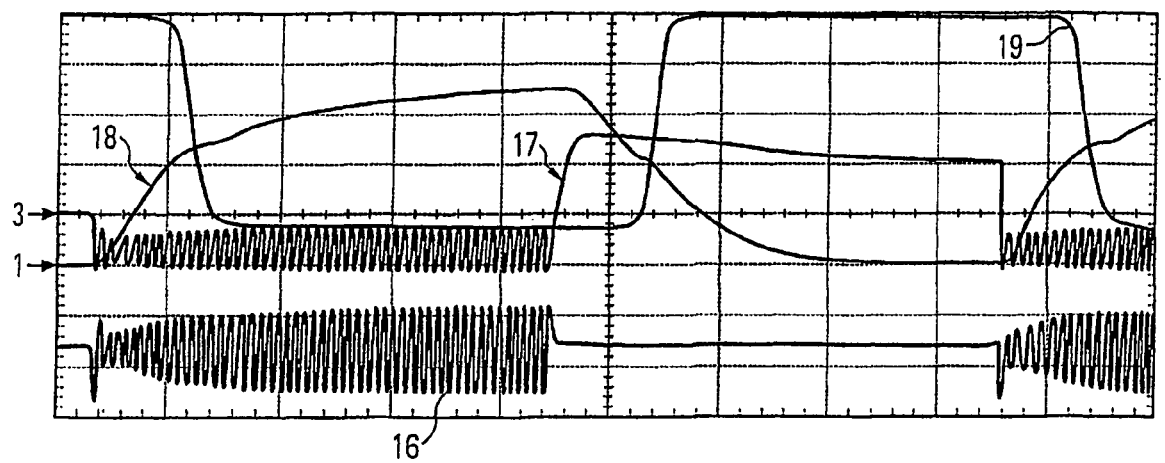

With reference to the signal developments of FIGS. 3a and 3b the sending out a digital bit in accordance with the present invention is now to be explained in more detail. FIG. 3a thereby shows an enlarged detail of the middle area of FIG. 3b.

It is thereby assumed that the DALI standard is used, with which the logical information "1" corresponds to the zero level. Thus in the following the transmission of such a "1" is to be explained.

With 16 there are shown the high frequency impulses which are applied for example by a controller of an operating device to the input side of the transformer. The pulse duty ratio may thereby be for example 400 µs/400 µs.

With 17 there is designated the voltage which controls the discharging of the low pass of second order 13 into the low pass discharge circuit 14.

With 18 there is shown the control voltage of the switch 12 (for example the gate voltage in case of an FET transistor).

Finally, with 19 there is shown the voltage modulated onto the bus. A falling flank (transition to the low voltage level) can be seen at the bus signal 19 in the left region. This falling flank is triggered in that the threshold value of the gate voltage of the switch 12 is exceeded and the switch is therefore switched on. As long as the high frequency signal 16 is now applied on the input side at the transformer, the gate of the switch 12 is charged constantly so that this time period of application of the high frequency impulses 16 at the input side of the transformer defines the period of a bit, i.e. the timing period.

When now these high frequency impulses 16 are no longer applied to the transformer, after a period determined by the controller, the voltage 17 increases and the low pass discharge circuit 14 is finally activated. Through this the gate voltage of the switch 12 is now reduced. As soon as the threshold value for the gate voltage of the switch 12 is again undershot, the switch 12 blocks again and an increasing flank arises at the bus signal 19.

The development of the flanks is adjusted substantially by choice of the parameters of the low pass circuit 13 as well as the low pass discharge circuit 14 in cooperation with the switch 12.

Furthermore the invention has advantages to the effect that it is suitable for different protocol definitions as will be described in more detail in the following.

There are now also standards with which an error report is effected in the event of a reduced bus voltage for example to less than 5 volts, by means of a current flow in a range of for example 0.8 mA to 2 mA.

With known circuits this current flow is achieved by a temporary short circuiting of the attached bus, with the disadvantage that because of the generated-short circuit it comes to collisions on the bus if at the time point of an error message of one bus user a protocol should be sent to other bus users.

The invention avoids this short circuiting of the bus for the purpose of an error message, when a connected bus controller provides a voltage for example of 4-5 volts. This is achieved in that the receiver part of the interface, i.e. in particular the optical coupling device Q3 and the Z-diode Z1, is bridged. For this purpose in the following case the transformer is controlled on the input side such that although the switch 12 is not yet switched through (which would mean "transmit"), the secondary-side voltage suffices however to control the bipolar switch 15 for bridging for example the optical coupling device.

In accordance with the definition mentioned first a flank falling to zero thus represents the beginning of a transmitted bit, whilst in the other case the fall to a low current level not equal to zero serves as an error message (other devices can nevertheless still send on the bus since—exactly as in regular reception cases—only a maximum current of 2 mA is drawn. However, this does not influence the high level of the bus.

The discrimination whether a transmission by control of the switch 12 or an error message by control of the switch 15, is to be effected is made by the cooperation of the low pass circuit of second order 13 with different input side control signals of the transformer. The discrimination can in particular be achieved by means of different pulse/break ratios of the input side signals.

For example there can be chosen for the transmission by control of the switch a ratio of 400 µs on, 400 µs off. For the error message by control alone of the switch 15 there can for example be chosen a ratio in which the "on" period is chosen substantially shorter and the duty ratio is chosen considerably lower, which thus suffices to switch the switch 15.

There is thus provided a discrimination circuit, of which the transformer can absolutely also be counted as a part, which discriminates control signals applied to the input side to the effect there is effected selectively by means of closing of a first switch a falling flank on the bus, or by closing of a second switch a bridging of the transmission branch. Thus the transformer is only one realization possibility; other passive analog discrimination circuits are also conceivable. The same applies to the low pass circuit, which likewise represents only one conceivable implementation.

The invention claimed is:

1. Interface circuit having at least a transmission branch for the transmission of digital signals from an operating device for illumination means to a connected bus, and further comprising a transformer for effecting the transmission, wherein on the input side the transformer is controlled with a signal which is high-frequency in comparison with the bit length of the digital signals.

2. Circuit according to claim 1, wherein the bit length of the digital signals on the bus corresponds to the period during which there is applied to the transformer on the input side a signal which is high-frequency in comparison with the bit length.

3. Circuit according to claim 1, comprising a switch controlled by the secondary side of the transformer wherein, the switch modulates the digital signals onto the bus.

4. Circuit according to claim 3, wherein the switch is a transistor.

5. Circuit according to claim 3, wherein the flank steepness of the switching processes of the switch is selectable.

6. Circuit according to claim 5, wherein the flank steepness of the switching processes is selectable by corresponding choice of the parameters of filter circuits.

7. Circuit according to claim 6, wherein the filter circuits are low pass circuits.

8. Circuit according to claim 5, wherein the rising and falling flanks are adjustable independently of each other.

9. Circuit according to claim 1, comprising a controller to control the transformer on the input side.

10. Circuit according to claim 1, configured as a bidirectional interface and comprising a reception branch.

11. Bidirectional interface circuit comprising
a transmission branch for the transmission of digital signals of an operating device for at least one illumination element to a connected bus, whereby the transmission is effected with the aid of a transformer,
a reception branch, and
a discrimination circuit which discriminates control signals applied to the transformer on an input side thereof to the effect that selectively via the transmission branch a falling flank is effected on the bus or a bridging of the transmission branch is effected.

12. Interface circuit according to claim 11, wherein the discrimination circuit is a filter circuit.

13. Interface circuit according to claim 11, wherein the discrimination circuit distinguishes different pulse/break ratios of the control signals.

14. Interface circuit according to claim 11, wherein the discrimination circuit is a passive circuit.

15. Interface circuit according to claim 11, wherein the discrimination circuit is an analog circuit.

16. Operating device for illumination elements, comprising a circuit according to claim 11.

17. Bidirectional interface circuit comprising
a transmission branch for the transmission of digital signals of an operating device for at least one illumination element to a connected bus,
a reception branch, and
a discrimination circuit which discriminates control signals applied on an input side to the effect that selectively by closing a first switch via the transmission branch a falling flank is effected on the bus or alternatively by closing a second switch a bridging of the transmission branch is effected.

18. Interface circuit according to claim 17, wherein the discrimination circuit is a passive circuit.

19. Interface circuit according to claim 17, wherein the discrimination circuit is an analog circuit.

20. Operating device for illumination elements, comprising a circuit according to claim 17.

21. Method for the transmission of signals from a control device to a connected digital bus, comprising:
controlling the primary side of a transformer by a control device, and
controlling a switch that modulates digital signals onto the bus, by means of a secondary side of the transformer, wherein on the input side the transformer is controlled with a signal which is high-frequency in comparison with the bit length of the digital signals.

22. Method for the transmission of signals from a control device of a bidirectional interface having a transmission branch and a reception branch to a connected digital bus, comprising controlling the primary side of a transformer by a control device, and dependent upon the choice of the parameters of the control signals attained by the transmission branch either a falling flank on the bus or a bridging of the reception branch.

23. Method according to claim 22, wherein the parameter of the control signals is a pulse/break relationship.

24. Method for the transmission of signals from a control device of a bidirectional interface having a transmission branch and a reception branch to a connected digital bus, comprising controlling a discrimination circuit by a control device, and by means of this discrimination circuit dependent upon the choice of the parameters of the control signals attaining the transmission branch either a falling flank on the bus or a bridging of the reception branch.

* * * * *